United States Patent
Yao et al.

(10) Patent No.: US 10,466,892 B2
(45) Date of Patent: Nov. 5, 2019

(54) INTERACTIVE HANDWRITING DISPLAY DEVICE AND INTERACTIVE HANDWRITING CAPTURE DEVICE

(71) Applicants: CHI HSIANG OPTICS CO., LTD., Hsinchu (TW); NEOLAB CONVERGENCE TAIWAN INC., Taipei (TW)

(72) Inventors: Po-Hung Yao, Hsinchu (TW); Hsien-Ching Chang, Taipei (TW)

(73) Assignees: CHI HSIANG OPTICS CO., LTD., Hsinchu (TW); NEOLAB CONVERGENCE TAIWAN INC., Taipei (TW)

( * ) Notice: Subject to any disclaimer, the term of this patent is extended or adjusted under 35 U.S.C. 154(b) by 130 days.

(21) Appl. No.: 15/723,959

(22) Filed: Oct. 3, 2017

(65) Prior Publication Data

US 2018/0101296 A1    Apr. 12, 2018

(30) Foreign Application Priority Data

Oct. 7, 2016    (TW) .............................. 105132490 A

(51) Int. Cl.
   *G06F 3/0488*   (2013.01)
   *G06F 3/041*    (2006.01)
   *G06F 3/01*     (2006.01)

(52) U.S. Cl.
   CPC .......... *G06F 3/04883* (2013.01); *G06F 3/017* (2013.01); *G06F 3/0416* (2013.01)

(58) Field of Classification Search
   CPC ............. G06F 3/03542; G06F 3/04883; G06F 3/0416; G06F 3/017; G06F 3/0321
   (Continued)

(56) References Cited

U.S. PATENT DOCUMENTS

| | | | | |
|---|---|---|---|---|
| 8,692,212 B1 * | 4/2014 | Craft | ..................... | G06F 3/0317 250/458.1 |
| 8,860,696 B2 * | 10/2014 | Wassvik | ................ | G06F 3/0412 178/18.01 |

(Continued)

FOREIGN PATENT DOCUMENTS

| | | | | |
|---|---|---|---|---|
| WO | WO-2015200396 A1 * | 12/2015 | ............. | G06F 3/044 |
| WO | WO-2016004003 A1 * | 1/2016 | ........... | G06F 3/0488 |

*Primary Examiner* — Amare Mengistu
*Assistant Examiner* — Jennifer L Zubajlo
(74) *Attorney, Agent, or Firm* — Birch, Stewart, Kolasch & Birch, LLP

(57) ABSTRACT

Provided are an interactive handwriting display device and an interactive handwriting capture device. The interactive handwriting display device has a display panel and a patterned band-pass filter component, and the patterned band-pass filter component has a substrate and multiple band-pass filter units. The interactive handwriting capture device includes an optical signal selector, an image-forming module, a photodetector chip and a microprocessor. By using the interactive handwriting display device with a patterned filtering function and the interactive handwriting capture device with the recognition function, the addressable ITO sensor's need of electrical connection is eliminated, providing interactive operating function and the writing function of high sensitivity and accuracy. Also, the manufacturing complexities are reduced and the integration of components is improved as the touch screens get larger in size.

13 Claims, 8 Drawing Sheets

(58) Field of Classification Search
USPC .............................. 178/18.09, 18.11; 345/175
See application file for complete search history.

(56) References Cited

U.S. PATENT DOCUMENTS

| | | | |
|---|---|---|---|
| 10,216,975 B1* | 2/2019 | He ....................... | G06K 9/2018 |
| 2008/0170184 A1 | 7/2008 | Byun et al. | |
| 2009/0279170 A1 | 11/2009 | Miyazaki et al. | |
| 2011/0227874 A1* | 9/2011 | Fahraeus ............... | G06F 3/0421 |
| | | | 345/175 |
| 2012/0263381 A1* | 10/2012 | Yoshida .............. | G06F 3/03545 |
| | | | 382/189 |
| 2013/0257825 A1* | 10/2013 | Thompson .......... | G06F 3/03542 |
| | | | 345/179 |
| 2013/0300703 A1 | 11/2013 | Sjögren et al. | |
| 2014/0285475 A1* | 9/2014 | Ogata ................. | G06F 3/03545 |
| | | | 345/175 |
| 2015/0015482 A1* | 1/2015 | Njolstad ............... | G06F 3/0386 |
| | | | 345/156 |
| 2015/0029165 A1* | 1/2015 | Thompson ............ | G06F 3/0416 |
| | | | 345/179 |
| 2016/0179335 A1* | 6/2016 | Thompson .............. | G06F 3/041 |
| | | | 345/173 |
| 2016/0291782 A1* | 10/2016 | Zhai ......................... | G06F 3/044 |
| 2017/0131798 A1* | 5/2017 | Geaghan ................. | G06F 3/044 |
| 2017/0153763 A1* | 6/2017 | Vavra .................... | G06F 3/0488 |

* cited by examiner

INTERACTIVE HANDWRITING DISPLAY DEVICE AND INTERACTIVE HANDWRITING CAPTURE DEVICE

CROSS-REFERENCE TO RELATED APPLICATION

The present invention claims the priority of Taiwan Patent Application No. 105132490 filed on Oct. 7, 2016, which is incorporated by reference in the present application in its entirety.

BACKGROUND OF THE INVENTION

1. Field of the Invention

The present invention relates to the technological field of display and capture, more particularly to a display device and a capture device with handwriting recognition and interactive operation functions.

2. Description of the Prior Arts

In order to provide the conventional flat panel display with interactive operation function, the prior art has developed an integration of the flat panel display and a variety of touch modules with different sensing principles to form touch screens such as resistive, capacitive or optical touch screens. Users can press the touch screens by fingers or touch pens to implement instructions or input text. General touch screens can be divided into added-on touch screens and embedded touch screens. Among them, the added-on touch screens employ a single-layered or double-layered patterned indium tin oxide (ITO) transparent conductive layer or a nano-metal layer to form an addressable resistive or capacitive sensor. The embedded touch screens are based on a similar principle, but one of the indium tin oxide layers is integrated into the TFT substrate to form a frame of the in-cell embedded touch screen, or set between the color filter and the second polarizer to form a frame of the on-cell embedded touch screen.

However, the above-mentioned touch screens all need indium tin oxide sensors electrically connected to generate electrical signal changes and then provide interactive operation function. Moreover, the integration of the panel display and the touch modules to form resistive, capacitive or optical touch screens requires complicated technologies and processing, resulting in that the conventional touch screens have the shortcomings of high manufacturing costs. In addition, the resistive touch screens have poor sensitivity and poor durability and hardly achieve miniaturization in thickness, so they are not the mainstream technique in the current touch panel market; the capacitive touch screens fail to function accurately or normally with the static or electromagnetic interference, and the optical touch screens usually have signal shielding problems when a user is operating with both hands.

Therefore, there is still a need to effectively overcome the limitation in interactive handwriting operation function.

SUMMARY OF THE INVENTION

In view of the above-mentioned drawbacks of the prior arts, the present invention provides an interactive display device which is different from the conventional resistive and capacitive touch screens. One objective of the present invention is to free the limitation of the addressable ITO sensor that requires electrical connection to provide interactive operating function, to overcome the difficulties of manufacturing large area touch screens, and to obviate the malfunctions during operation.

Another objective of the present invention is to simplify the manufacturing process and to improve the touch products integration, thereby keeping the cost down and reducing the waste of the earth's resources, for example, reduction of carbon emissions.

To achieve the foresaid objectives, the present invention provides an interactive handwriting display device which comprises a display panel and a patterned band-pass filter component formed on the display panel. The patterned band-pass filter component comprises a substrate and multiple band-pass filter units, the substrate is formed on the display panel, and the multiple band-pass filter units are formed on the substrate.

The substrate of the interactive handwriting display device comprises a first optical surface and a second optical surface opposite the first optical surface; the first optical surface faces the display panel and the multiple band-pass filter units are disposed on the second optical surface of the substrate.

The substrate of the interactive handwriting display device comprises a first optical surface and a second optical surface opposite the first optical surface; the first optical surface faces the display panel, and the multiple band-pass filter units are disposed between the first optical surface of the substrate and the display panel.

Preferably, the patterned band-pass filter component further has a wave filter (layer), which is disposed between the substrate and the multiple band-pass filter units. The patterned band-pass filter component can provide a different filtering function by means of the combination of the wave filter and the multiple band-pass filter units or only the multiple band-pass filter units.

Preferably, the display panel may be, but not limited to, a liquid crystal display (LCD), an organic light-emitting diode display (OLED), or an electronic ink (e-paper). Preferably, the display panel may be a reflective display panel.

Preferably, the substrate of the patterned band-pass filter component is made from transparent materials, and the materials may be, but not limited to, polycarbonate (PC), polyethylene terephthalate (PET), polymethyl methacrylate (PMMA), cyclo olefin polymer (COP), nylon, polypropylene (PP), polyethylene (PE), triacetate cellulose (TAC), or any combination thereof.

Preferably, the multiple band-pass filter units of the patterned band-pass filter component have a specific electromagnetic wave filtering bandwidth to filter light of a specific bandwidth and allow light of the remaining wavelength range to pass.

In accordance with the instant disclosure, the patterned band-pass filter component may be a wave filter made of liquid crystals. The multiple band-pass filter units of the patterned band-pass filter component are in the shape of ovals, circles, lines, polygons, or any combination thereof.

Preferably, the multiple band-pass filter units may comprise at least one filter subunit allowing only light of a specific wavelength to pass. In one of the embodiments, the multiple band-pass filter units may comprise at least a first band-pass filter subunit and a second band-pass filter subunit; the passing wavelength range of the first band-pass filter subunit is different from the passing wavelength range of the second band-pass filter subunit.

Preferably, the multiple band-pass filter units may be on the second optical surface of the substrate in a regular or irregular arrangement. Or, the multiple band-pass filter units may be disposed between the first optical surface of the substrate and the display panel in a regular or irregular arrangement.

Preferably, the interactive handwriting display device further comprises an adhesive layer, which is disposed between the display panel and the first optical surface of the substrate. The material of the adhesive layer may be silicone pressure-sensitive adhesive, acrylic optical clear adhesive, or polyurethane (PU) pressure-sensitive adhesive, but is not limited thereto.

Preferably, the interactive handwriting display device further has an optical layer which is disposed between the first optical surface of the substrate and the display panel. In one of the embodiments, the optical layer may be a wave retarder or a polarizer to adjust the polar characteristic of outgoing light and further match the incident light requirements of the patterned band-pass filter component.

Preferably, the interactive handwriting display device further has a protective layer disposed between the substrate and the display panel to protect the multiple band-pass filter units of the patterned band-pass filter component. For example, the protective layer may be, but not limited to, an anti-glare layer, an anti-reflective layer, a hard coat layer, a releasing layer, an abrasive resistant layer, an easy-clean layer, a stain-resistant layer, or any combination thereof.

In addition, the present invention provides an interactive handwriting capture device, which is used with the above-mentioned interactive handwriting display device. The interactive handwriting capture device comprises an optical signal selector, an image-forming module, a photodetector chip and a microprocessor. The optical signal selector filters the light from the interactive handwriting display device, the image-forming module is arranged above the optical signal selector for imaging light to the photodetector chip, and the photodetector chip transforms the light signals into electronic signals and outputs the electronic signals to the microprocessor.

Preferably, the optical signal selector is a wavelength selector.

In one of the embodiments, the patterned band-pass filter component of the interactive handwriting display device has the substrate and the multiple band-pass filter units but has no wave filters, and the wavelength range of the optical signal selector filters does not overlap the passing wavelength range of the multiple band-pass filter units. That is, when the selected wavelength range of the optical signal selector does not overlap the passing wavelength range of the multiple band-pass filter units, the optical signal selector can block the light emitted from the display panel and passing through the band-pass filter units, and the optical signal selector can partially or fully allow the light emitted from the display panel without passing through the multiple band-pass filter units.

In another one of the embodiments, the patterned band-pass filter component of the interactive handwriting display device has the substrate, the wave filter and the multiple band-pass filter units, the selected wavelength range of the optical signal selector does not overlap the passing wavelength range of the wave filter, and the selected wavelength range of the optical signal selector overlaps the passing wavelength range of the combination of the wave filter and the multiple band-pass filter units. That is, when the selected wavelength range of the optical signal selector only overlaps the passing wavelength range of the combination of the wave filter and the multiple band-pass filter units but do not overlap the passing wavelength range of the wave filter, the optical signal selector can block the light emitted from the display panel and passing through the wave filter but not through the band-pass filter units, and the optical signal selector can partially or fully allow the light emitted from the display panel and passing through the combination of the wave filter and the multiple band-pass filter units.

In accordance with the instant disclosure, the selected wavelength range of the optical signal selector filters means a specific wavelength bandwidth can be allowed to pass through by the optical signal selector; the passing wavelength range of the multiple band-pass filter units means a specific wavelength bandwidth can be allowed to pass through the multiple band-pass filter units; the passing wavelength range of the combination of the wave filter and the multiple band-pass filter units means that a specific wavelength bandwidth can be allowed to pass through the combination of the wave filter and the multiple band-pass filter units when the light is introduced sequentially through the wave filter and the multiple band-pass filter units.

Preferably, the interactive handwriting capture device further has a user identity module, such as a fingerprint identity module to identify the user's fingerprints or a voice identity module to identify the user's voice, and the identity module can transfer the identification result to the microprocessor.

Preferably, the optical signal selector has a light input side and a light output side, and the interactive handwriting capture device further has a built-in auxiliary light source which is set on the light input side or on the light output side.

Preferably, the interactive handwriting capture device further has a wireless radiation module connecting to the microprocessor and outputting the electronic signal calculated by the microprocessor.

DETAILED DESCRIPTION OF THE PREFERRED EMBODIMENTS

Example 1: Interactive Handwriting Display Device

Figure 1:
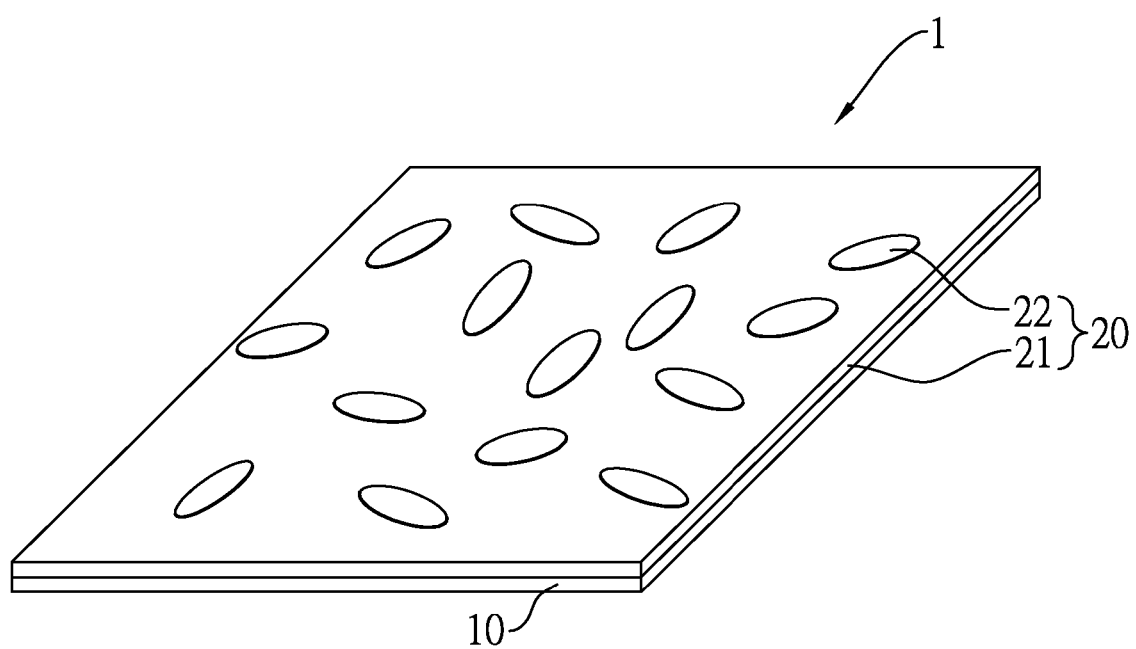
FIG. 1 is a perspective view of an interactive handwriting display device of Example 1.
Figure 2:
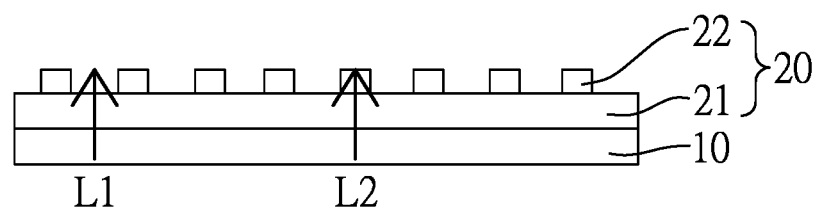
FIG. 2 is a side view of the interactive handwriting display device of Example 1.

A representative example of an interactive handwriting display device 1 of Example 1 in accordance with the present invention is illustrated in FIGS. 1 and 2. The interactive handwriting display device 1 comprises a display panel 10 and a patterned band-pass filter component 20.

The display panel 10 is a liquid crystal display panel having a light source with a plurality of wavelength bands;

the patterned band-pass filter component 20 is mounted on a light output surface of the display panel 10.

The patterned band-pass filter component 20 comprises a transparent substrate 21 and multiple band-pass filter units 22. The transparent substrate 21 is mounted on the light output surface of the display panel 10. The transparent substrate 21 comprises a first optical surface and a second optical surface opposite the first optical surface; the first optical surface faces the display panel 10, and the multiple band-pass filter units 22 are separately formed on the second optical surface of the transparent substrate 21. In this embodiment, the transparent substrate 21 is made of polycarbonate, but it is not limited thereto. In other embodiments, the transparent substrate 21 may be made of PET, PMMA, COP, nylon, PP, PE, triacetate cellulose (TAC), or any combination thereof.

With reference to FIG. 1, each of the multiple band-pass filter units 22 is elliptical in shape, but it is not limited thereto. In other embodiments, the multiple band-pass filter units 22 may comprise two or more different shapes, such as ovals, circles, lines, polygons, or any combination thereof.

In the present embodiment, the band-pass filter units 22 of the patterned band-pass filter component 20 are composed of wave filters with a specific filtering bandwidth of light, and the band-pass filter units 22 can select light of the specific bandwidth from the wide wavelength range to limit the passing wavelength bandwidth. For example, the wavelength of 380 nm to 780 nm light is output from the display panel 10 and the passing wavelength of the band-pass filter units 22 ranges from 400 nm to 780 nm; when the light passes through the band-pass filter units 22 of the patterned band-pass filter component 20, the passing light wavelength ranges from 400 nm to 780 nm. Therefore, the interactive handwriting display device can obtain the patterned filter intensity distribution map, and the map can be compiled into plane position coordinate information, security information, or password message.

In the present embodiment, the band-pass filter units 22 of the patterned band-pass filter component 20 can be arranged with a coding algorithm such as arranging the multiple units of the same shape on a plane and then interpreting by the coding algorithm to achieve the purpose of addressing.

Figure 3:
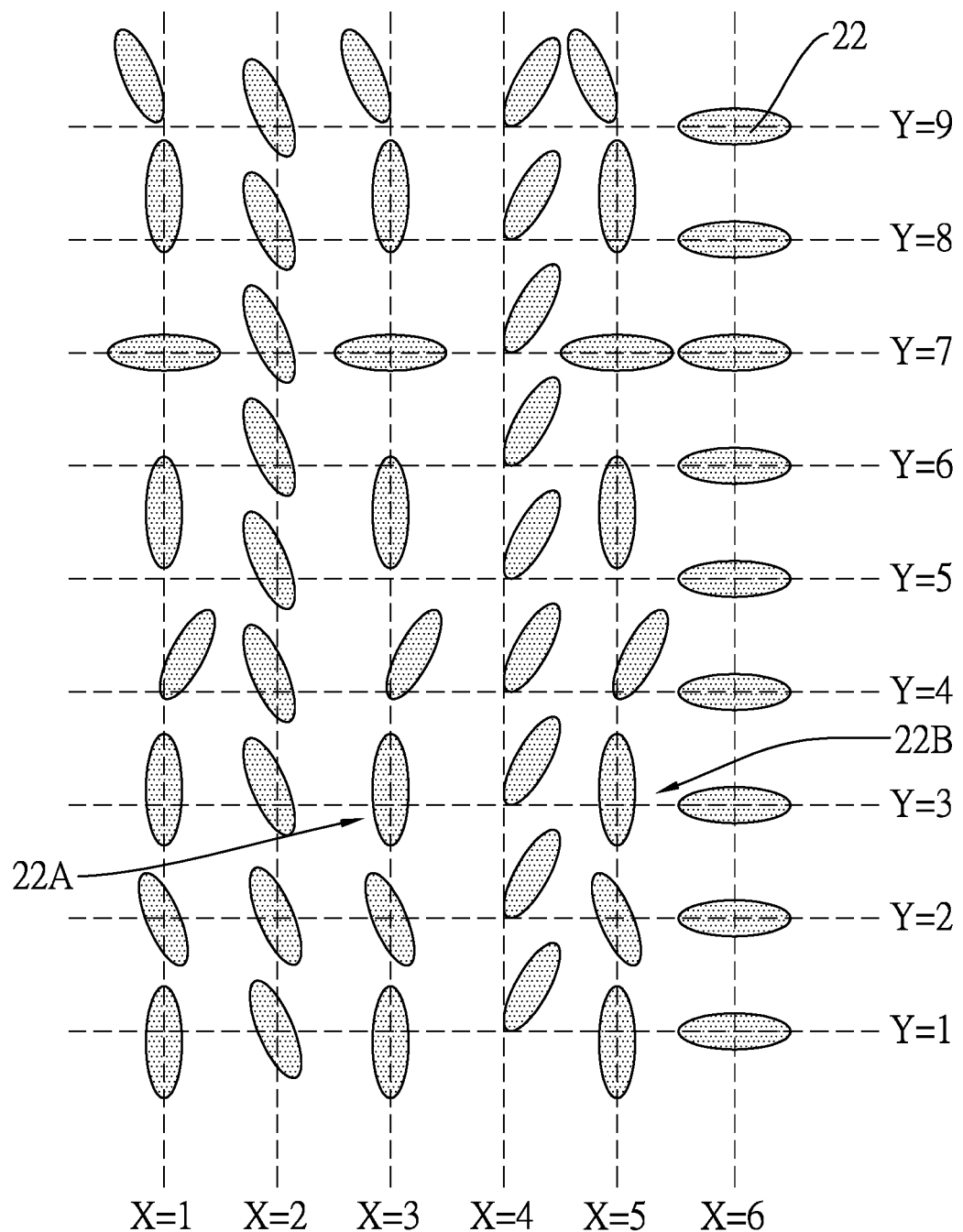
FIG. 3 illustrates a top schematic view of the multiple band-pass filter units of Example 1.

With reference to the arrangement of the band-pass filter units 22 as shown in FIG. 3, the elliptical band-pass filter units 22 at different plane positions represent different compiling messages. Specifically, the band-pass filter unit 22A located at x=3 and y=3 has the same shape and arrangement with the band-pass filter unit 22B located at x=5 and y=3, but the arrangement of those 8 band-pass filter units surrounding the band-pass filter unit 22A is different from the arrangement of those 8 band-pass filter units surrounding the band-pass filter unit 22B. As a result, it can use a coding algorithm to express a patterned filter intensity distribution map to achieve the purpose of the addressing.

Accordingly, the interactive handwriting display device of the present invention can use the simple band-pass filter units of the patterned band-pass filter component to achieve the purpose of addressing, thereby eliminating the limitation of the addressable ITO sensor's need of electrical connection to provide interactive operating function. Moreover, the interactive handwriting display device of the present invention can simplify the manufacturing process and reduce manufacturing expenses. Furthermore, the interactive handwriting display device reduces the complexity of manufacturing process and the difficulty of manufacturing large-size screens.

In addition, the present invention provides an interactive handwriting capture device 30, which is used with the foresaid interactive handwriting display device. The interactive handwriting capture device 30 is a pattern signal capture device to capture the patterned filter intensity distribution map produced from the interactive handwriting display device. In appearance, the interactive handwriting capture device 30 may be manufactured as, but not limited to, a stylus.

Figure 4:
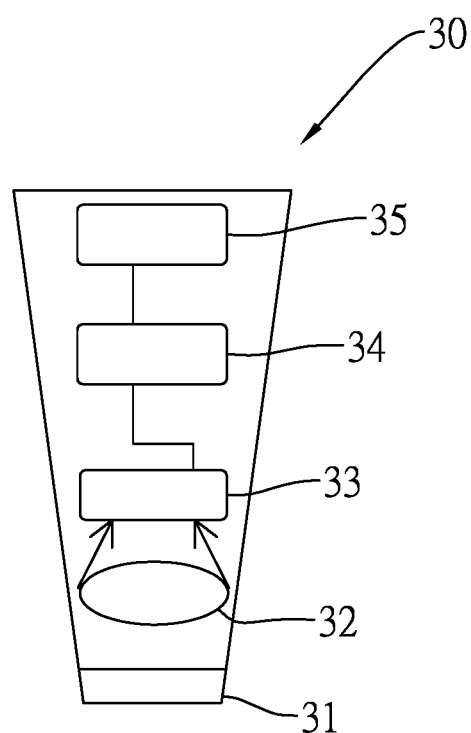
FIG. 4 illustrates the stereogram of the interactive handwriting capture device.
Figure 5:
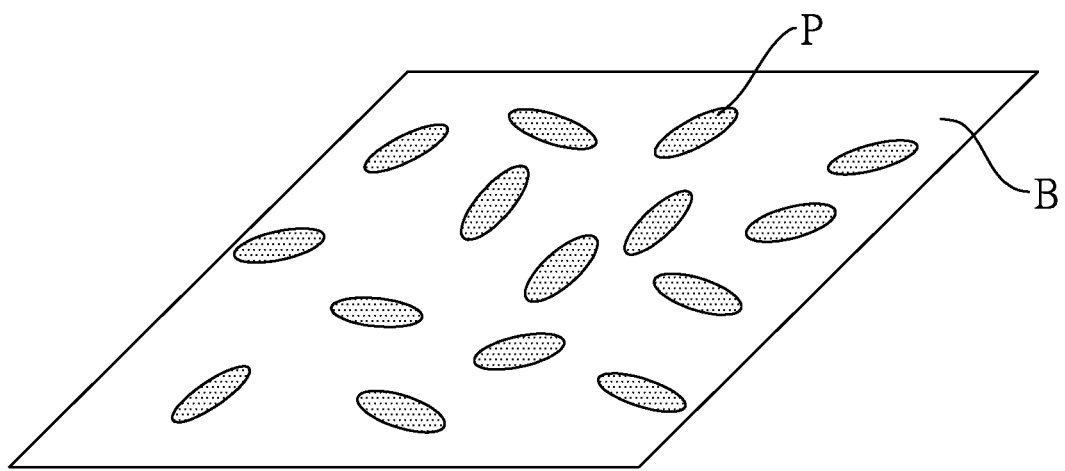
FIG. 5 illustrates the patterned distribution image obtained from the photodetector chip when used with the interactive handwriting display device of Example 1.

With reference to FIG. 4, the interactive handwriting capture device 30 comprises an optical signal selector 31, an image-forming module 32, a photodetector chip 33 and a microprocessor 34.

The optical signal selector 31 located at the end of the interactive handwriting capture device 30 is composed of a specific wavelength bandwidth selecting element. The optical signal selector 31 can select the light outputting from the interactive handwriting display device.

The optical signal selector 31 can select a suitable range of the wavelength corresponding to the band-pass filter units of the interactive handwriting display device. Then, according to the selected wavelength range, the optical signal selector 31 can block the light emitted from the display panel and passing through the band-pass filter units but allow the passing of the light of the selected wavelength range that is emitted from the display panel without passing through the band-pass filter units.

The image-forming module 32 may be composed of image-forming mirrors and is disposed above the optical signal selector 31. The image-forming module 32 can receive the light passing through the optical signal selector 31 from the interactive handwriting display device, and then focus the light onto the photodetector chip 33 to obtain the optical signal of the patterned filter intensity distribution map. In other embodiments, the mage-forming module 32 may be composed of the combination of an optical fiber and an imaging lens.

Corresponding to the passing wavelength of the foresaid band-pass filter units 22 (400 nm to 780 nm), the selecting wavelength bandwidth of the optical signal selector 31 does not overlap the passing wavelength range of the band-pass filter units (that is, the selecting wavelength bandwidth of the optical signal selector 31 ranges from 380 nm to 400 nm); the output light L2 of the specific area of the interactive handwriting display device (that is, the light from the display panel which passes through the band-pass filter units 22, L2, as shown in FIG. 2) will be blocked from the optical signal selector 31 and cannot pass through the optical signal selector 31 to reach the photodetector chip 33; the output light L1 of the remaining area of the interactive handwriting display device (that is, the light from the display panel which does not pass through the band-pass filter units 22, L1 as shown in FIG. 2) will not be blocked from the optical signal selector 31 and can pass through the optical signal selector 31 to reach the photodetector chip 33. Therefore, it can obtain the pattern distributing image with the dark pattern P and bright background B.

The photodetector chip 33 can transform the light signals of the pattern distributing image to the electronic signals to the microprocessor 34.

The microprocessor 34 can interpret the electronic signals into the corresponding data or action messages to the memory (not shown in the figures) or the peripheral receiving devices (not shown in the figures).

For example, when the user operates in a conventional writing mode, the microprocessor 34 may output the data or action messages to the peripheral receiving devices such as a display processor, the interactive handwriting capture device 30 can recognize the writing track and transmit the information to the display processor, and thereby the interactive handwriting capture device 30 can display the user's writing content.

In a preferred embodiment, the interactive handwriting capture device 30 further has a user identity module. The identity module is a fingerprint identity module to identify the identity data corresponding to user's fingerprints, and the identity module can transmit the identification result to the microprocessor.

Example 2: Interactive Handwriting Display Device

Figure 6:
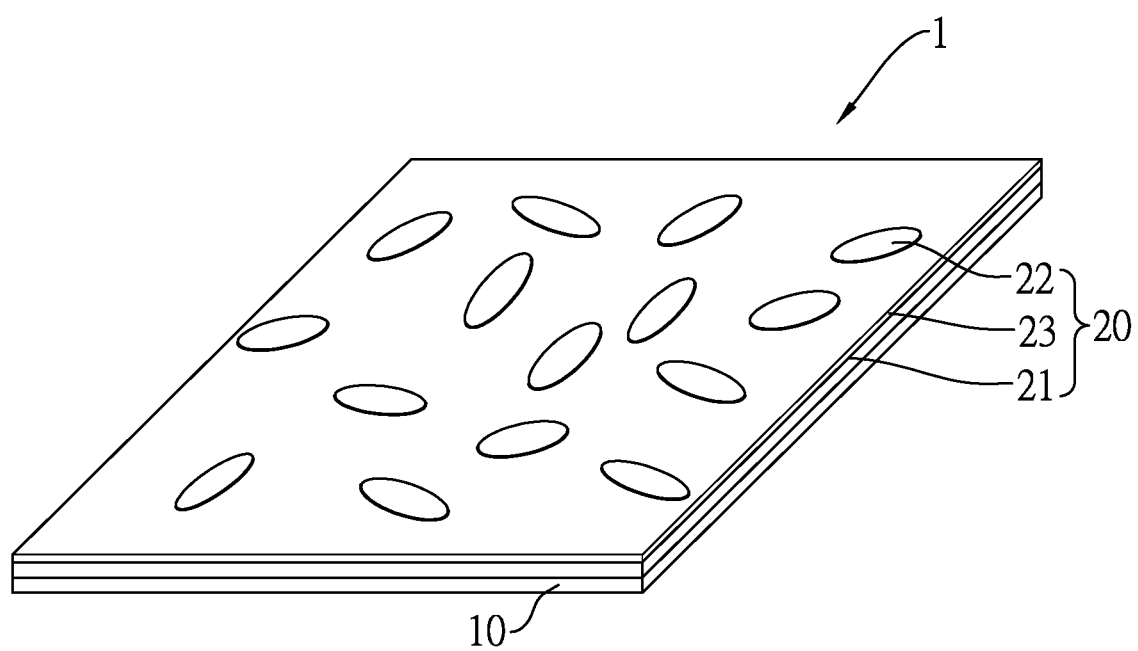
FIG. 6 illustrates the stereogram of the interactive handwriting display device of Example 2.
Figure 7:
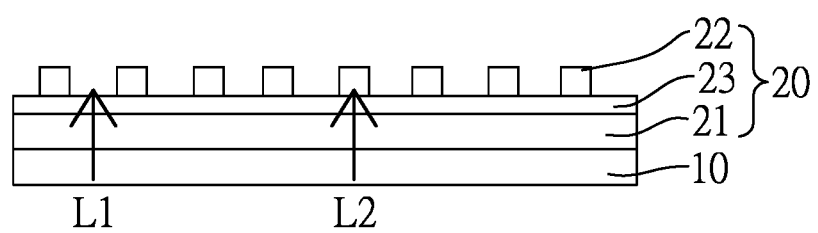
FIG. 7 is a side view of the interactive handwriting display device of Example 2.
Figure 8:
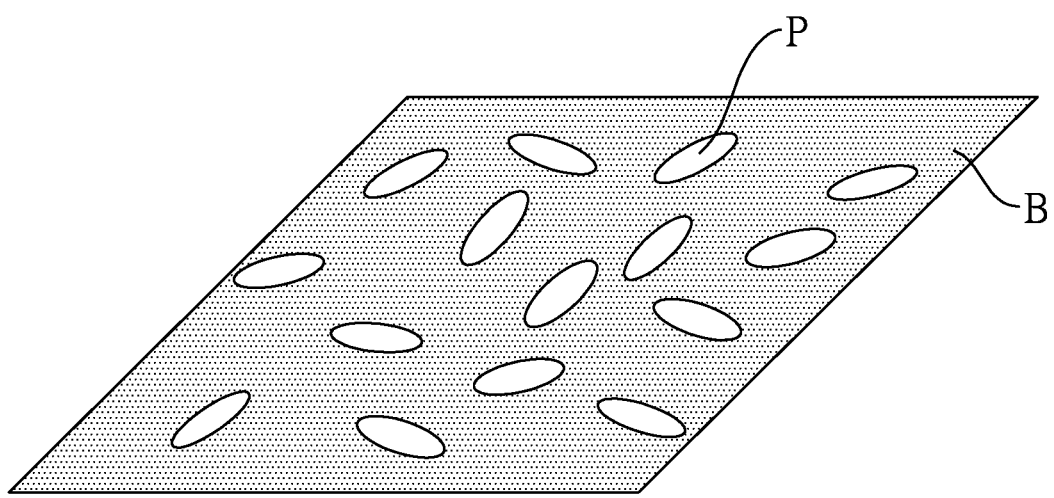
FIG. 8 illustrates the patterned distribution image obtained from the photodetector chip when used with the interactive handwriting display device of Example 2.

Another example of an interactive handwriting display device 1 of Example 2 in accordance with the present invention is illustrated in FIGS. 6 and 7. The interactive handwriting display device 1 is similar with the interactive handwriting display device of Example 1. The interactive handwriting display device 1 also comprises a display panel 10, a transparent substrate 21 and multiple band-pass filter units 22.

However, the difference between Example 1 and Example 2 is that the patterned band-pass filter component 20 of Example 2 further comprises a wave filter 23, which is sandwiched between the transparent substrate 21 and multiple band-pass filter units 22, and the multiple band-pass filter units 22 are separately formed on the wave filter 23. The band-pass filter units 22 and the wave filter 23 of the patterned band-pass filter component 20 can select light of the specific bandwidth from the wide wavelength range to limit the passing wavelength bandwidth.

The interactive handwriting display device 1 of Example 2 may be used with the foresaid interactive handwriting display device.

The selecting wavelength range of the optical signal selector 31 does not overlap the passing wavelength range of the wave filter 23 (that is, the selecting wavelength bandwidth of the optical signal selector 31 ranges from 380 nm to 400 nm, and the passing wavelength bandwidth of the wave filter 23 ranges from 401 nm to 780 nm), but the selecting wavelength range of the optical signal selector 31 partially overlaps the passing wavelength range of the combination of the wave filter 23 and the band-pass filter units 22 (380 nm to 780 nm). The output light L1 of the specific area of the interactive handwriting display device (that is, the light which is emitted from the display panel and passes through the wave filter 23 but not through the band-pass filter units 22, as shown in FIG. 7) will be blocked from the optical signal selector 31 and cannot pass through the optical signal selector 31 to reach the photodetector chip 33; the output light L2 of the remaining area of the interactive handwriting display device (that is, the light that is emitted from the display panel and passes through the wave filter 23 and the band-pass filter units 22 in sequence, L2, as shown in FIG. 7) will be allowed to pass through the overlapping bandwidth to reach the photodetector chip 33 via the optical signal selector 31. Therefore, it can obtain the pattern distributing image with the bright pattern P and dark background B.

According to the present invention, the interactive handwriting display device may be used with the interactive handwriting display device. Owing to the interactive handwriting display device with specific band-pass filter units and the interactive handwriting capture device with a specific optical signal selector, the interactive handwriting display device has a patterned filtering function, and the interactive handwriting capture device has the recognition function to recognize the patterned filtering results. The wavelength bandwidths of the light output from the display panel of the interactive handwriting display device are different because part of the light emitted from the interactive handwriting display device passes through the band-pass filter units and the remaining light does not. Also, the selecting wavelength range of the optical signal selector can selectively block the light from the interactive handwriting display device. As a result, the filtering intensity distribution patterns of the overall light output range is created. By using the optical signal selector and the patterned band-pass filter component which has different shapes or pattern arrangements, the purpose of addressing is achieved to provide the writing and interactive handwriting operation functions of high sensitivity and accuracy.

Compared with the conventional optical capture device, the interactive handwriting capture device of the present invention can obtain an addressable filtering intensity distribution map by directly receiving the light emitted from the interactive handwriting display device and passing through the optical signal selector. Therefore, the present invention has no need for additional configuration of the IR diode to provide the required light signal.

In accordance with the present invention, the patterned band-pass filter component can be directly integrated into any existing display panels, so the present invention can provide a simpler and more convenient means of integration and structure.

Compared with the conventional IR touch module, the interactive handwriting display device does not have a shading problem in use and does not need an outside frame to bury the IR diode and IR sensor.

Compared with the conventional resistive or capacitive touch module, the interactive handwriting display device is more conducive to be directly integrated into any existing large-size display panels and can avoid the more harsh limitation on the conductivity of the conductive layer of the large-size resistive or capacitive touch module (lower surface resistance is required with larger size of the display panel, resulting in higher complexity of the manufacturing technique.)

In addition, the invention overcomes shortcomings of the multi-bonding process which may reduce the production yield. The invention substantially simplifies the manufacturing process and improves component integration.

Therefore, the interactive handwriting display device of the invention is particularly suitable for large-size display device such as multi-functional conference display devices or electronic whiteboards for education.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An interactive handwriting display device, the interactive handwriting display device comprising:
    a display panel;
    a patterned band-pass filter component formed on the display panel;
    wherein the patterned band-pass filter component comprises a substrate, multiple band-pass filter units, and a wave filter; the substrate is formed on the display panel, the multiple band-pass filter units are formed on the substrate, and the wave filter is disposed between the substrate and the multiple band-pass filter units; and an optical layer disposed between the substrate of the patterned band-pass filter component and the display panel;

wherein the optical layer is a wave retarder or a polarizer;

wherein the multiple band-pass filter units comprise a first band-pass filter subunit and a second band-pass filter subunit; wherein the passing wavelength range of the first band-pass filter subunit is different from the passing wavelength range of the second band-pass filter subunit.

2. The interactive handwriting display device as claimed in claim 1, wherein the substrate comprises a first optical surface and a second optical surface opposite the first optical surface; the first optical surface faces the display panel and the multiple band-pass filter units are formed on the second optical surface of the substrate.

3. The interactive handwriting display device as claimed in claim 1, wherein the substrate comprises a first optical surface and a second optical surface opposite the first optical surface; the first optical surface faces the display panel, and the multiple band-pass filter units are disposed between the first optical surface of the substrate and the display panel.

4. The interactive handwriting display device as claimed in claim 1, wherein the multiple band-pass filter units are in the shape of ovals, circles, lines, polygons, or any combination thereof.

5. The interactive handwriting display device as claimed in claim 1, wherein the interactive handwriting display device further has a protective layer disposed between the substrate and the display panel; the protective layer is an anti-glare layer, an anti-reflective layer, a hard coat layer, a releasing layer, an abrasive resistant layer, an easy-clean layer, a stain-resistant layer, or any combination thereof.

6. An interactive handwriting capture device, used with the interactive handwriting display device as claimed in claim 1, wherein the interactive handwriting capture device comprises an optical signal selector, an image-forming module, a photodetector chip and a microprocessor; wherein the optical signal selector filters light from the interactive handwriting display device, the image-forming module is arranged above the optical signal selector for imaging light to the photodetector chip, and the photodetector chip transforms light signals into electronic signals and outputs the electronic signals to the microprocessor.

7. The interactive handwriting capture device as claimed in claim 6, wherein the substrate of the interactive handwriting display device comprises a first optical surface and a second optical surface opposite the first optical surface; the first optical surface faces the display panel and the multiple band-pass filter units are formed on the second optical surface of the substrate.

8. The interactive handwriting capture device as claimed in claim 6, wherein the substrate of the interactive handwriting display device comprises a first optical surface and a second optical surface opposite the first optical surface; the first optical surface faces the display panel, and the multiple band-pass filter units are disposed between the first optical surface of the substrate and the display panel.

9. The interactive handwriting capture device as claimed in claim 6, wherein the optical signal selector is a wavelength selector.

10. The interactive handwriting capture device as claimed in claim 6, wherein the interactive handwriting capture device further has a user identity module to transfer the identification result to the microprocessor.

11. The interactive handwriting capture device as claimed in claim 6, wherein the optical signal selector has a light input side and a light output side, and the interactive handwriting capture device further has a built-in auxiliary light source which is set on the light input side or on the light output side.

12. The interactive handwriting capture device as claimed in claim 6, wherein the interactive handwriting capture device further has a wireless radiation module connecting to the microprocessor and outputting the electronic signal calculated by the microprocessor.

13. The interactive handwriting capture device as claimed in claim 6, wherein the selected wavelength range of the optical signal selector does not overlap the passing wavelength range of the wave filter of the interactive handwriting display device, and the selected wavelength range of the optical signal selector overlaps the passing wavelength range of the combination of the wave filter and the multiple band-pass filter units of the interactive handwriting display device.

* * * * *